United States Patent
Lu et al.

(10) Patent No.: US 11,510,042 B2
(45) Date of Patent: Nov. 22, 2022

(54) GAME CONTROLLER FOR MOBILE DEVICE

(71) Applicant: DEXIN CORPORATION, New Taipei (TW)

(72) Inventors: Ho-Lung Lu, New Taipei (TW); Yuan-Jung Chang, New Taipei (TW)

(73) Assignee: DEXIN CORPORATION, New Taipei (TW)

( * ) Notice: Subject to any disclaimer, the term of this patent is extended or adjusted under 35 U.S.C. 154(b) by 0 days.

(21) Appl. No.: 17/529,270

(22) Filed: Nov. 18, 2021

(65) Prior Publication Data
US 2022/0201450 A1    Jun. 23, 2022

Related U.S. Application Data

(60) Provisional application No. 63/126,536, filed on Dec. 17, 2020.

(30) Foreign Application Priority Data

Aug. 13, 2021 (TW) ................ 110129868

(51) Int. Cl.
  *H04W 4/80* (2018.01)
  *H04R 1/10* (2006.01)
  *H04W 76/10* (2018.01)
(52) U.S. Cl.
  CPC ............ *H04W 4/80* (2018.02); *H04R 1/1091* (2013.01); *H04W 76/10* (2018.02); *H04R 2420/07* (2013.01)

(58) Field of Classification Search
  CPC ....... H04W 4/80; H04W 76/10; H04W 84/18; H04W 76/14; H04R 1/1091; H04R 2420/07
  USPC ......................................... 455/41.3
  See application file for complete search history.

(56) References Cited

U.S. PATENT DOCUMENTS

| | | | | |
|---|---|---|---|---|
| 2011/0260969 A1* | 10/2011 | Workman | ............. | G06F 3/0202 345/161 |
| 2013/0031275 A1* | 1/2013 | Hanes | ..................... | G06F 3/038 710/5 |
| 2015/0031452 A1* | 1/2015 | Rundell | .................. | A63F 13/23 463/31 |
| 2017/0243324 A1* | 8/2017 | Mierle | .................. | G06T 3/0093 |
| 2020/0401222 A1* | 12/2020 | Wisbey | .................. | G06N 5/003 |

* cited by examiner

*Primary Examiner* — Eugene Yun
(74) *Attorney, Agent, or Firm* — Li & Cai Intellectual Property Office

(57) ABSTRACT

A game controller for a mobile device is provided. The game controller includes a control module, a first audio module, and a second audio module. The mobile device includes a first wireless communication module. The first audio module is wirelessly connected to an audio device. The second audio module is electrically connected to the mobile device, so as to control the mobile device to be wirelessly connected to the audio device. A pairing between the audio device and the first audio module and a pairing between the audio device and the first wireless communication module of the mobile device are performed before the audio device is used. The control module generates a control command according to a category of audio information of the mobile device, so as to output the audio information to the audio device through the first audio module or the second audio module.

13 Claims, 4 Drawing Sheets

GAME CONTROLLER FOR MOBILE DEVICE

CROSS-REFERENCE TO RELATED PATENT APPLICATION

This application claims priority to the U.S. Provisional Patent Application Ser. No. 63/126,536 filed on Dec. 17, 2020 and to Taiwan Patent Application No. 110129868 filed on Aug. 13, 2021, which applications are incorporated herein by reference in their entirety.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a game controller, and more particularly to a game controller for a mobile device.

BACKGROUND OF THE DISCLOSURE

With the development and popularization of mobile devices, the number of users playing games on the mobile devices is increasing, thereby bringing about a rapid growth of the mobile game market. When the users play games, watch videos, or listen to music, a headphone is often used with their mobile devices. A cable of a wired headphone can easily lead to space limitation and storage inconvenience, and is prone to wear and tear. As such, more and more users use wireless headphones. The conventional wireless headphones mainly use a BLUETOOTH® technology for audio transmission with a phone. However, a signal transmitted by the BLUETOOTH® technology is easily interfered, which causes an audio latency and affects a user experience during gaming, video watching, or music listening.

Therefore, how to improve the delay in gaming or in audio/video transmission, so as to overcome the above-mentioned issues, has become one of the important issues to be addressed in the related field.

SUMMARY OF THE DISCLOSURE

In response to the above-referenced technical inadequacies, the present disclosure provides a game controller for a mobile device.

In one aspect, the present disclosure provides a game controller for a mobile device, which includes a control module, a first audio module, and a second audio module. The mobile device includes a first wireless communication module. The control module is electrically connected to the mobile device. The first audio module is electrically connected to the mobile device and the control module, and the first audio module is wirelessly connected to an audio device. The second audio module is electrically connected to the mobile device and the control module, so as to control the mobile device to be wirelessly connected to the audio device. A pairing between the audio device and the first audio module and a pairing between the audio device and the first wireless communication module of the mobile device are performed before the audio device is used. The control module is configured to generate a control command according to a category of audio information of the mobile device, so as to output the audio information to the audio device through the first audio module or the second audio module.

In certain embodiments, the control module is configured to generate a first control command according to a first audio information of the mobile device, so as to control the first audio module to output the first audio information to the audio device through the first audio module.

In certain embodiments, the first audio information is audio information of a game, a video, or music.

In certain embodiments, according to a second audio information of the mobile device, the control module is configured to generate a second control command for controlling the second audio module, such that the second audio module controls the mobile device to output the second audio information to the audio device through the first wireless communication module of the mobile device.

In certain embodiments, the second audio information is audio information of a phone call or a voice call made through a communication software.

In certain embodiments, the control module is configured to generate a third control command according to a third audio information of the mobile device so as to control the first audio module and the second audio module to transmit the third audio information to the audio device respectively through the first audio module and the first wireless communication module of the mobile device. The third audio information includes the first audio information and the second audio information.

In certain embodiments, the third control command is generated when the mobile device switches from outputting the first audio information to outputting the second audio information, or when the mobile device switches from outputting the second audio information to outputting the first audio information.

In certain embodiments, after the control module generates the third control command to control the first audio module and the second audio module, the first audio module outputs the third audio information to the audio device according to the third control command.

In certain embodiments, the game controller further includes a human-computer interaction module. The human-computer interaction module is correspondingly and electrically connected to the control module, the first audio module, and the second audio module. The human-computer interaction module is configured to generate a human-computer interaction instruction according to the third control command, and the human-computer interaction module receives a fourth control command that is input by a user according to the human-computer interaction instruction, so as to control the third audio information to be transmitted to the audio device through the first audio module or the second audio module.

In certain embodiments, the audio device is a wireless headphone, and the wireless headphone includes two transceivers respectively corresponding to the first wireless communication module of the mobile device and the first audio module.

In certain embodiments, the first audio module includes a 2.4 GHz wireless transceiver.

In certain embodiments, the first wireless communication module of the mobile device includes a BLUETOOTH® transceiver.

In certain embodiments, the first audio module includes a 2.4 GHz wireless transceiver, and the first wireless communication module of the mobile device includes a BLUETOOTH® transceiver.

Therefore, in the game controller for the mobile device provided by the present disclosure, by virtue of "the pairing between the audio device and the first audio module and the pairing between the audio device and the first wireless communication module of the mobile device being performed before the audio device is used" and "the control module being configured to generate the control command according to the category of the audio information of the mobile device, so as to output the audio information to the audio device through the first audio module or the second audio module," switching between different audio information outputs can be done in a more timely manner and an audio latency can be improved, thereby improving a user experience.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
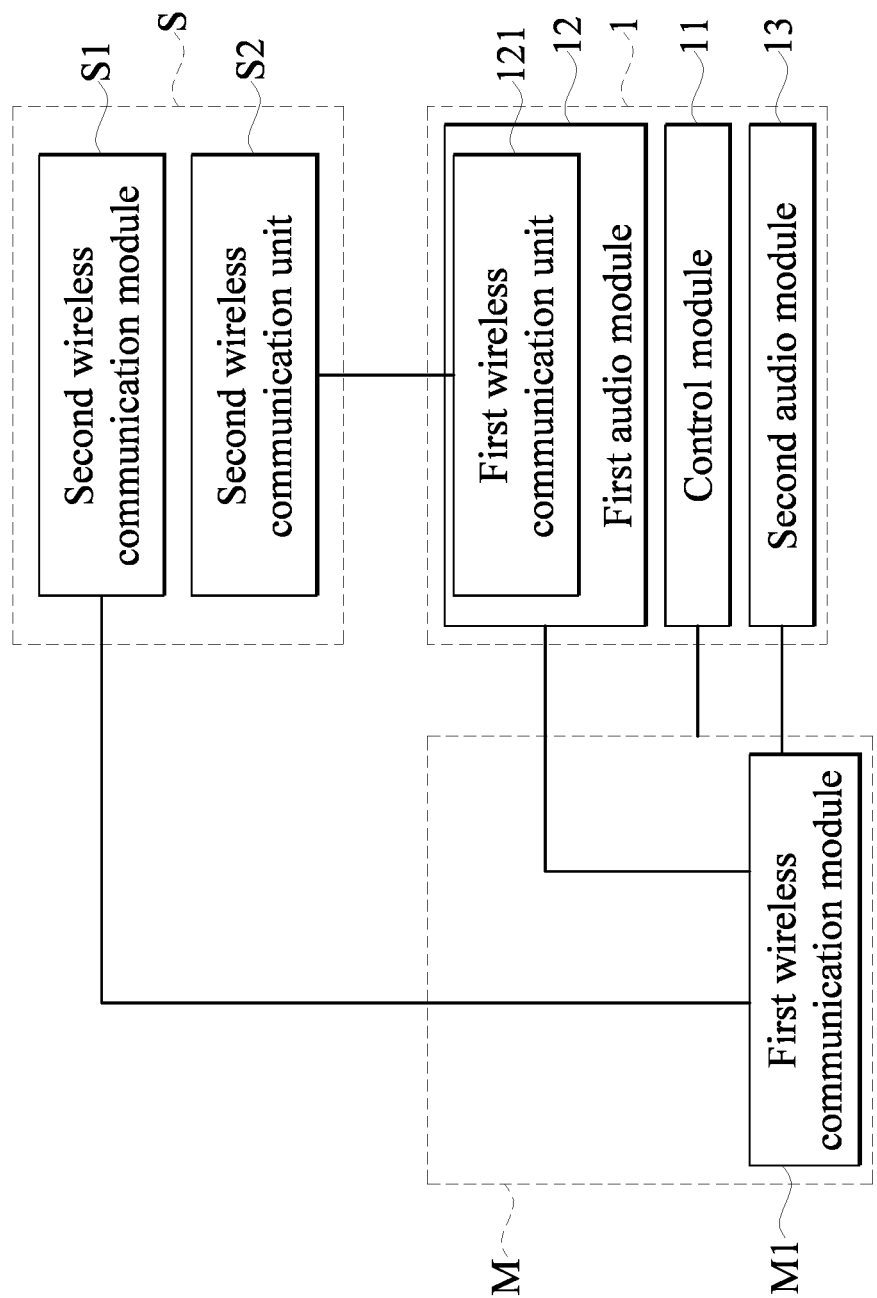
FIG. 1 is a functional block diagram of a game controller being in cooperation with a mobile device and an audio device according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Embodiments

Referring to FIG. 1, a first embodiment of the present disclosure provides a game controller 1 for a mobile device M, which includes a control module 11, a first audio module 12, and a second audio module 13.

In the present embodiment, the mobile device M can be a smart phone, a tablet, etc., but the present disclosure is not limited thereto. In addition, the mobile device M at least includes a first wireless communication module M1, and the first wireless communication module M1 can include, for example but limited to, a WI-FI® transceiver, a BLUETOOTH® transceiver, a 2.4 GHz wireless transceiver, a ZIGBEE® transceiver, a LoRa transceiver, a Sigfox transceiver, or an NB-IoT transceiver. In one particular embodiment, the first wireless communication module M1 of the mobile device M includes the BLUETOOTH® transceiver.

Figure 2:
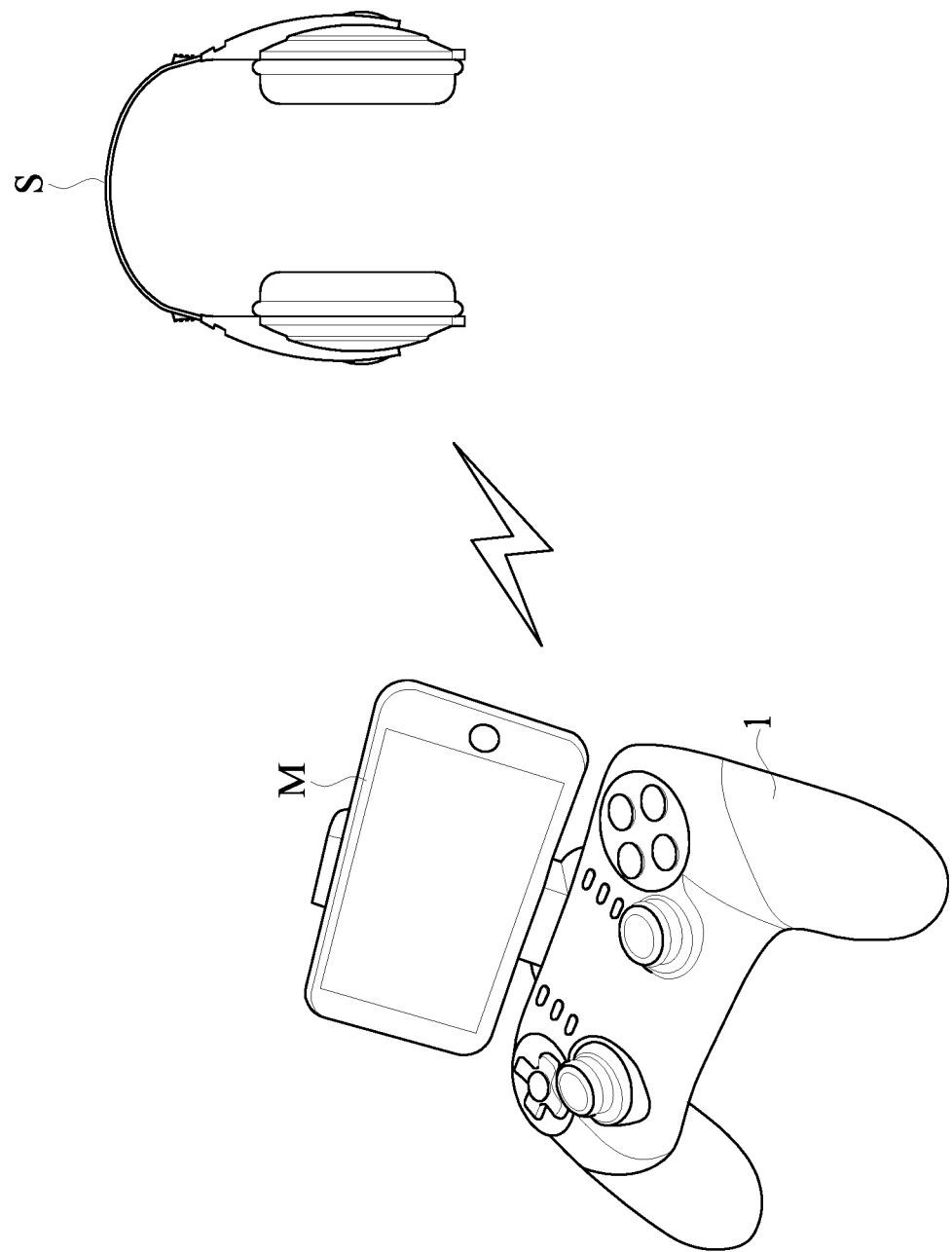
FIG. 2 is a schematic view showing a game controller being used in cooperation with a mobile device and an audio device according to one embodiment of the present disclosure.
Figure 3:
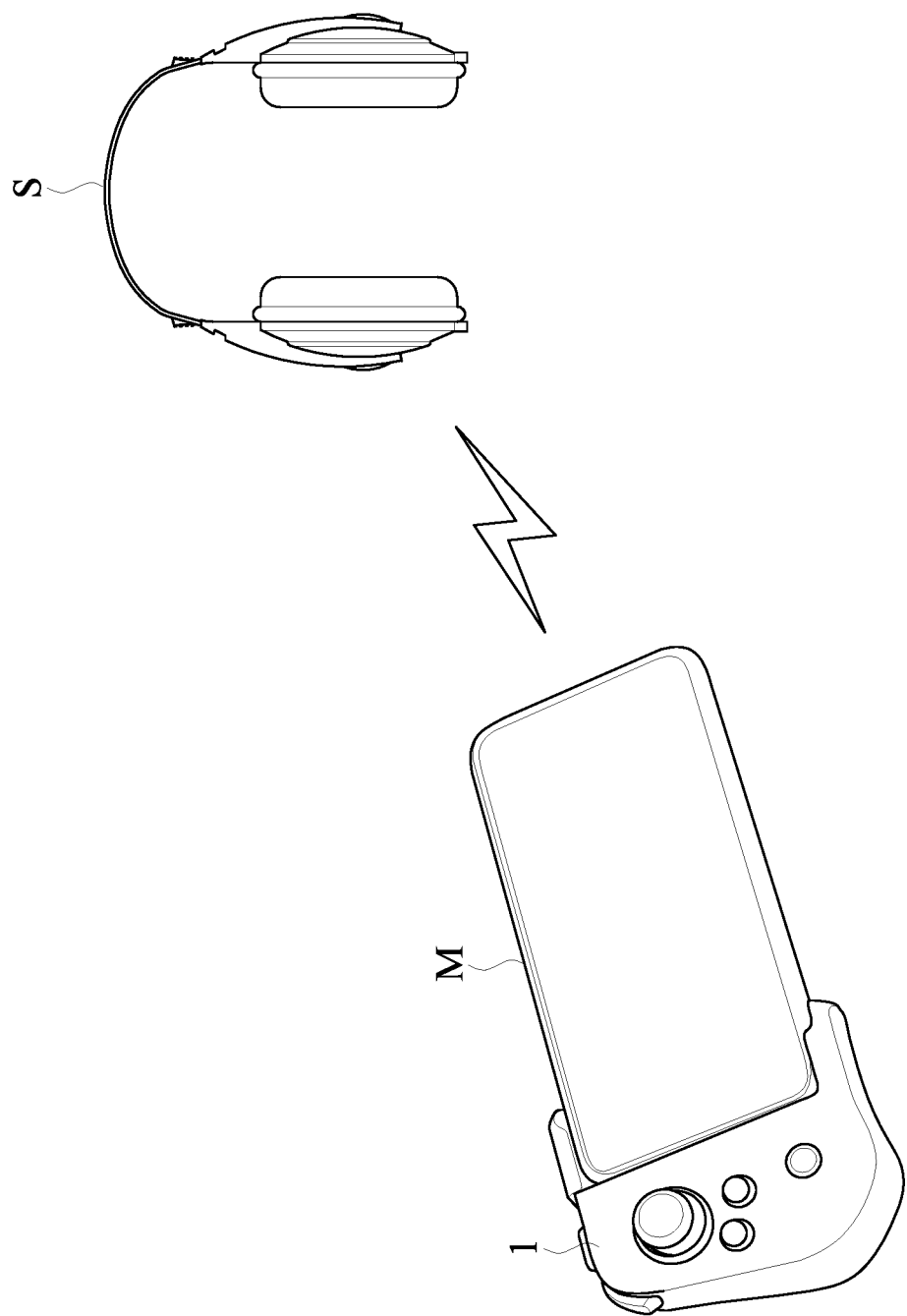
FIG. 3 is a schematic view showing the game controller being used in cooperation with the mobile device and the audio device according to another embodiment of the present disclosure.
Figure 4:
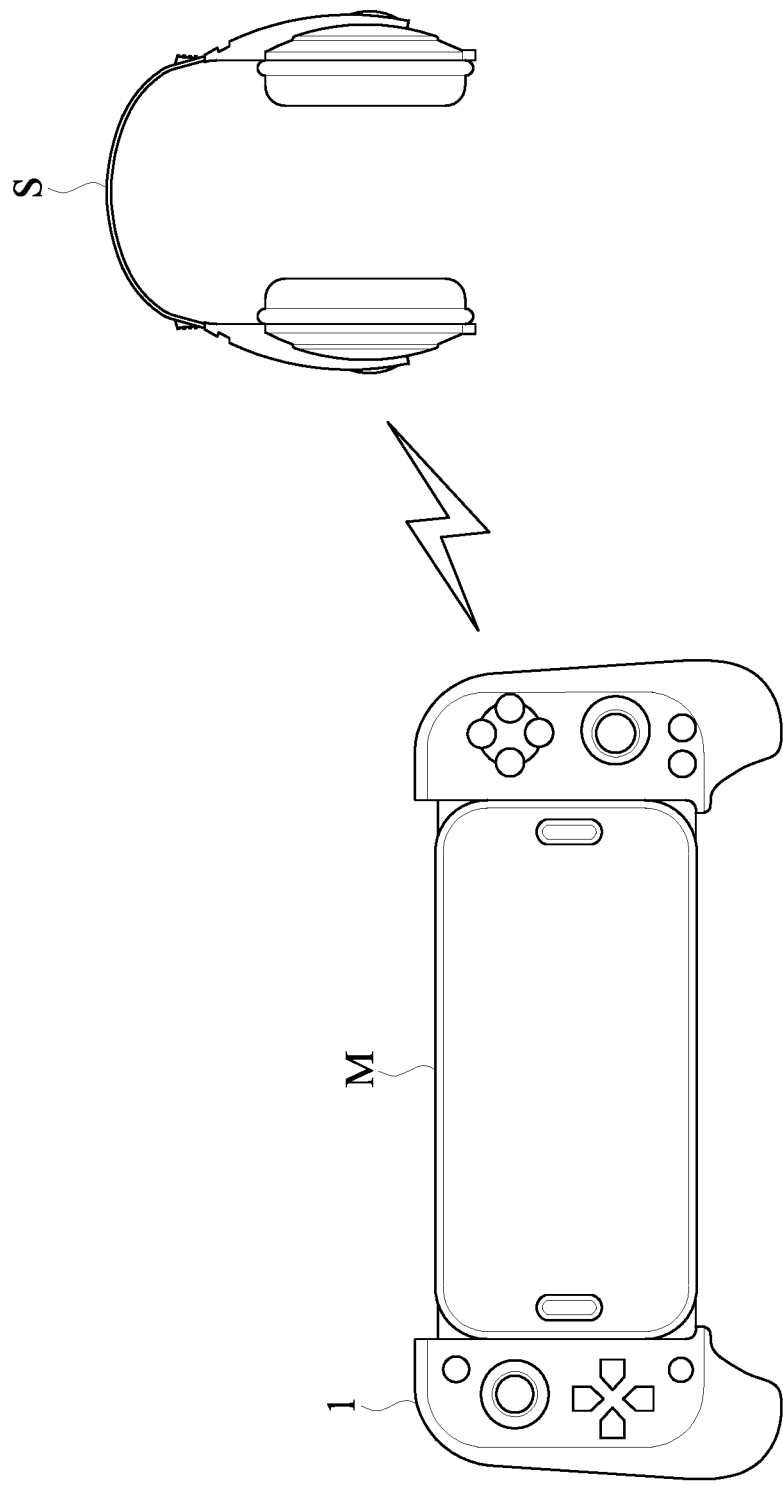
FIG. 4 is a schematic view showing the game controller being used in cooperation with the mobile device and the audio device according to yet another embodiment of the present disclosure in use.

Referring to FIG. 2 to FIG. 4, FIG. 2 to FIG. 4 are each a schematic view of a game controller being used in cooperation with a mobile device and an audio device according to embodiments of the present disclosure. The game controller 1 can include at least one first gamepad, and the game controller 1 is connected to the mobile device M through the first gamepad. In other embodiments, the game controller 1 can further include a second gamepad, and the mobile device M is connected between the first gamepad and the second gamepad. A configuration of internal components of the game controller 1 can be adjusted according to a structure of the first gamepad and a structure of the second gamepad, but the present disclosure is not limited thereto. In addition, at least one battery module can be disposed in the game controller 1. The battery module can be charged through the mobile device M that is connected thereto, or through an external power source. Moreover, the battery module can also be connected to the game controller 1 in a pluggable manner, such that power supply to the game controller 1 can be maintained by changing the battery module, but the present disclosure is not limited thereto.

Furthermore, the game controller 1 can be connected to the mobile device M through a LIGHTNING® connector, a Type-A universal serial bus (Type-A USB) connector, a Type-C USB connector, or a micro USB connector, so as to control an operation thereof.

The control module 11 is disposed in the game controller 1, and the control module 11 is electrically connected to the mobile device M. In the present embodiment, the control module 11 can be a central processing unit (CPU), an application-specific integrated circuit (ASIC), or a microprocessor.

The first audio module 12 is disposed in the game controller 1, and the first audio module 12 is correspondingly and electrically connected to the mobile device M and the control module 11. The first audio module 12 can further include a first wireless communication unit 121. The first wireless communication unit 121 can include, for example but not limited to, a WI-FI® transceiver, a BLUETOOTH® transceiver, a 2.4 GHz wireless transceiver, a ZIGBEE® transceiver, a LoRa transceiver, a Sigfox transceiver, or an NB-IoT transceiver. In one particular embodiment, the first audio module 12 includes the 2.4 GHz wireless transceiver. More specifically, when the game controller 1 is connected to the mobile device M, the first wireless communication unit 121 of the first audio module 12 is wirelessly connected to a corresponding one of at least one audio device S, and audio information of the mobile device M can be transmitted to the corresponding one of the audio device S through the first wireless communication unit 121 of the first audio module 12.

The second audio module 13 is disposed in the game controller 1, and the second audio module 13 is correspondingly and electrically connected to the mobile device M and the control module 11. More specifically, the second audio module 13 is electrically connected to the first wireless communication M1 of the mobile device M, so as to control the mobile device M to transmit the audio information to the corresponding one of the audio device S through the first wireless communication module M1.

In the present embodiment, the audio device S includes a second wireless communication module S1 that corresponds to the first wireless communication module M1 of the mobile device M, and a second wireless communication unit S2 that corresponds to the first wireless communication unit 121 of the first audio module 12. In one particular embodiment, the second wireless communication module S1 can include the 2.4 GHz wireless transceiver, and the second wireless communication unit S2 can include the BLUETOOTH® transceiver. In the present embodiment, the audio device S can be a headset, a speaker, a smart speaker, an in-vehicle information system, etc. In one particular embodiment, the audio device S is a wireless headset.

In should be noted that, a pairing between the audio device S and the game controller 1 and a pairing between the audio device S and the mobile device M are performed before the audio device S is used. That is, the second wireless communication module S1 and the second wireless communication unit S2 of the audio device S are respectively paired with the first wireless communication module M1 of the mobile device M and the first wireless communication unit 121 of the first audio module 12 before the audio device S is used, so that the audio information can be transmitted smoothly and an audio latency can be improved. The pairing process described above is a conventional technique, and will not be described in detail herein.

Furthermore, through the control of the control module 11, the first audio module 12 or the second audio module 13 can be electrically connected to the mobile device M. That is to say, the control module 11 can define a use mode and generate a control command according to a category of the audio information of the mobile device M, so as to enable the first audio module 12 or the second audio module 13 to be electrically connected to the mobile device M. In addition, the control module 11 controls the audio information to be transmitted from the first wireless communication unit 121 of the first audio module 12 and the first wireless communication module M1 of the mobile device M respectively to the second wireless communication module S1 and the second wireless communication unit S2 of the audio device S.

For example, in the present embodiment, when a user plays a game, watches a video, or listens to music, the control module 11 defines such a condition as a first use mode and transmits a first control command to the first audio module 12, so as to enable the first audio module 12 to be electrically connected to the mobile device M. Then, the first audio module 12 controls the mobile device M to transmit audio information of the game, the video, or the music through the first wireless communication unit 121 and the second wireless communication unit S2.

In another aspect, in the present embodiment, when the user makes a phone call or makes a voice call through a communication software, the control module 11 defines such a condition as a second use mode and transmits a second control command to the second audio module 13, so as to enable the second audio module 13 to be electrically connected to the mobile device M. Then, the second audio module 13 controls the mobile device M to transmit audio information of the phone call or the voice call using the communication software through the first wireless communication module M1 and the second wireless communication module S1.

Furthermore, when an operation of the user switches from the first use mode to the second use mode or from the second use mode to the first use mode, the control module 11 defines such a condition as a third use mode and transmits a third control command to the first audio module 12 and the second audio module 13. According to this use mode, the audio information is transmitted to the audio device S correspondingly through the first audio module 12 and the second audio module 13. That is to say, when the operation of the user switches from playing the game, watching the video, or listening to the music to making the phone call or making the voice call through the communication software, the control module 11 transmits the third control command to the first audio module 12 and the second audio module 13, so as to enable the second audio module 13 to be electrically connected to the mobile device M. Then, the second audio module 13 controls the mobile device M to transmit the audio information of the phone call or the voice call using the communication software through the first wireless communication module M1 and the second wireless communication module S1. When the operation of the user switches from making the phone call or making the voice call through the communication software to playing the game, watching the video, or listening to the music, the control module 11 transmits the third control command to the first audio module 12 and the second audio module 13, so as to enable the first audio module 12 to be electrically connected to the mobile device M. Then, the first audio module 12 controls the mobile device M to transmit the audio information of the game, the video, or the music through the first wireless communication unit 121 and the second wireless communication unit S2.

It should be noted that, in the third use mode, after the control module 11 transmits the third control command to the first audio module 12 and the second audio module 13, the control module 11 can control the first audio module 12 to be continuously and electrically connected to the mobile device M. Therefore, both the audio information of the game, the video, or the music, and the audio information of the phone call or the voice call through the communication software are transmitted through the first wireless communication unit 121 of the first audio module 12 and the second wireless communication unit S2 according to the third control command.

Furthermore, the game controller 1 can include a human-computer interaction module that is correspondingly and electrically connected to the control module 11, the first audio module 12, and the second audio module 13. The human-computer interaction module can generate a human-computer interaction instruction according to the third control command of the control module 11, and the human-computer interaction module receives a fourth control command input by the user according to the human-computer interaction instruction, so as to control the transmission of the audio information to the audio device S through the first audio module 12 or the second audio module 13. That is to say, according to practical requirements, the user can control the first audio module 12 or the second audio module 13 to output the audio information to the audio device S through the human-computer interaction module.

The aforementioned human-computer interaction module can be software, firmware, hardware, or a combination of other software, firmware, and hardware that can achieve the functions described above.

However, the aforementioned examples describe only one of the embodiments of the present disclosure, and the present disclosure is not intended to be limited thereto.

Beneficial Effects of the Embodiments

In conclusion, in the game controller for the mobile device provided by the present disclosure, by virtue of "the pairing between the audio device S and the first audio module 12 and the pairing between the audio device S and the first wireless communication module M1 of the mobile device M being performed before the audio device S is used" and "the control module 11 being configured to generate the control command according to the category of the audio information of the mobile device M, so as to output the audio information to the audio device S through the first audio module 12 or the second audio module 13," switching between different audio information outputs can be done in a more timely manner and the audio latency can be improved, thereby improving a user experience.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A game controller for a mobile device, wherein the mobile device includes a first wireless communication module, the game controller comprising:
    a control module electrically connected to the mobile device;
    a first audio module electrically connected to the mobile device and the control module, wherein the first audio module is wirelessly connected to an audio device; and
    a second audio module electrically connected to the mobile device and the control module, so as to control the mobile device to be wirelessly connected to the audio device;
    wherein a pairing between the audio device and the first audio module and a pairing between the audio device and the first wireless communication module of the mobile device are performed before the audio device is used;
    wherein the control module is configured to generate a control command according to a category of audio information of the mobile device, so as to output the audio information to the audio device through the first audio module or the second audio module.

2. The game controller according to claim 1, wherein the control module is configured to generate a first control command according to a first audio information of the mobile device, so as to control the first audio module to output the first audio information to the audio device through the first audio module.

3. The game controller according to claim 2, wherein the first audio information is audio information of a game, a video, or music.

4. The game controller according to claim 2, wherein, according to a second audio information of the mobile device, the control module is configured to generate a second control command for controlling the second audio module, such that the second audio module controls mobile device to output the second audio information to the audio device through the first wireless communication module of the mobile device.

5. The game controller according to claim 4, wherein the second audio information is audio information of a phone call or a voice call made through a communication software.

6. The game controller according to claim 4, wherein the control module is configured to generate a third control command according to a third audio information of the mobile device, so as to control the first audio module and the second audio module to transmit the third audio information to the audio device respectively through the first audio module and the first wireless communication module of the mobile device; wherein the third audio information includes the first audio information and the second audio information.

7. The game controller according to claim 6, wherein the third control command is generated when the mobile device switches from outputting the first audio information to outputting the second audio information, or when the mobile device switches from outputting the second audio information to outputting the first audio information.

8. The game controller according to claim 6, wherein, after the control module generates the third control command to control the first audio module and the second audio module, the first audio module outputs the third audio information to the audio device according to the third control command.

9. The game controller according to claim 6, further comprising:
    a human-computer interaction module correspondingly and electrically connected to the control module, the first audio module, and the second audio module;
    wherein the human-computer interaction module is configured to generate a human-computer interaction instruction according to the third control command, and the human-computer interaction module receives a fourth control command that is input by a user according to the human-computer interaction instruction, so as to control the third audio information to be transmitted to the audio device through the first audio module or the second audio module.

10. The game controller according to claim 1, wherein the audio device is a wireless headphone, and the wireless headphone includes two transceivers respectively corresponding to the first wireless communication module of the mobile device and the first audio module.

11. The game controller according to claim 1, wherein the first audio module includes a 2.4 GHz wireless transceiver.

12. The game controller according to claim 1, wherein the first wireless communication module of the mobile device includes a BLUETOOTH® transceiver.

13. The game controller according to claim 1, wherein the first audio module includes a 2.4 GHz wireless transceiver, and the first wireless communication module of the mobile device includes a BLUETOOTH® transceiver.

* * * * *